United States Patent
Yonemoto et al.

(10) Patent No.: US 12,234,158 B2
(45) Date of Patent: Feb. 25, 2025

(54) METHODS FOR PREPARING PARTICLE PRECURSOR AND CATHODE ACTIVE PARTICLES, AND PARTICLE PRECURSOR PREPARED THEREBY

(71) Applicant: Microvast Power Systems Co., LTD., Huzhou (CN)

(72) Inventors: Bryan Yonemoto, Clearwater, FL (US); Xiao Zhang, Huzhou (CN); Huijie Guo, Huzhou (CN); Jianzhao Liu, Huzhou (CN)

(73) Assignee: MICROVAST ADVANCED MATERIALS INC., Lake Mary, FL (US)

( * ) Notice: Subject to any disclaimer, the term of this patent is extended or adjusted under 35 U.S.C. 154(b) by 1096 days.

(21) Appl. No.: 17/043,610

(22) PCT Filed: May 21, 2019

(86) PCT No.: PCT/CN2019/087871
§ 371 (c)(1),
(2) Date: Sep. 29, 2020

(87) PCT Pub. No.: WO2019/223705
PCT Pub. Date: Nov. 28, 2019

(65) Prior Publication Data
US 2021/0017040 A1    Jan. 21, 2021

Related U.S. Application Data

(60) Provisional application No. 62/674,592, filed on May 21, 2018.

(51) Int. Cl.
*C01G 53/00* (2006.01)
*H01M 4/04* (2006.01)
(Continued)

(52) U.S. Cl.
CPC ........ *C01G 53/006* (2013.01); *H01M 4/0471* (2013.01); *H01M 4/1391* (2013.01);
(Continued)

(58) Field of Classification Search
CPC .............. C01G 53/006; H01M 4/0471; H01M 4/1391; H01M 4/366; H01M 4/525
See application file for complete search history.

(56) References Cited

U.S. PATENT DOCUMENTS

| | | |
|---|---|---|
| 8,216,676 B2 | 7/2012 | Paulsen et al. |
| 9,406,930 B2 | 8/2016 | Fukui et al. |

(Continued)

FOREIGN PATENT DOCUMENTS

| | | |
|---|---|---|
| CN | 102394297 A | 3/2012 |
| CN | 103762353 A | 4/2014 |

(Continued)

*Primary Examiner* — James A Fiorito
(74) *Attorney, Agent, or Firm* — Cheng-Ju Chiang

(57) ABSTRACT

The invention relates to a method for preparing transitional-metal particles (cathode particle precursor) under a co-precipitation reaction. In this method, by feeding different types of anion compositions and/or cation compositions, and adjusting the pH to match with the species, precipitated particles are deposited to form a slurry, colleting the slurry, treating with water, and drying to get a cathode particle precursor. Mixing the cathode particle precursor with a lithium source and calcining to yield core-shell structured cathode active particles. Such cathode active particle can be used to prepare cathode of lithium-ion battery.

16 Claims, 6 Drawing Sheets

(51) Int. Cl.
*H01M 4/1391* (2010.01)
*H01M 4/36* (2006.01)
*H01M 4/525* (2010.01)
*H01M 4/02* (2006.01)

(52) U.S. Cl.
CPC ........... *H01M 4/366* (2013.01); *H01M 4/525* (2013.01); *C01P 2004/03* (2013.01); *C01P 2004/84* (2013.01); *H01M 2004/028* (2013.01)

(56) References Cited

U.S. PATENT DOCUMENTS

| | | |
|---|---|---|
| 9,876,226 B2 | 1/2018 | Paulsen et al. |
| 2013/0202966 A1* | 8/2013 | Yu .......................... H01M 4/505 429/223 |
| 2014/0131616 A1 | 5/2014 | Sun et al. |
| 2014/0377660 A1 | 12/2014 | Fukui et al. |

FOREIGN PATENT DOCUMENTS

| | | |
|---|---|---|
| CN | 103794752 A | 5/2014 |
| CN | 104852026 A | 8/2015 |
| CN | 104979553 A | 10/2015 |
| CN | 105514362 A | 4/2016 |
| CN | 106207140 A | 12/2016 |
| CN | 107359346 A | 11/2017 |
| JP | 4954476 B2 | 6/2012 |
| KR | 10-2014-0083854 A | 7/2014 |
| KR | 10-2015-0045784 A | 4/2015 |
| KR | 10-2017-0063419 A | 6/2017 |
| RU | 2408112 C1 | 12/2010 |
| RU | 2011148908 A | 6/2013 |

* cited by examiner

METHODS FOR PREPARING PARTICLE PRECURSOR AND CATHODE ACTIVE PARTICLES, AND PARTICLE PRECURSOR PREPARED THEREBY

TECHNICAL FIELD

The present disclosure relates to a method for preparing a lithium-ion battery cathode, particularly, to a method for preparing particle precursor without using organic chelating additives to alter the precipitation rates, a method for preparing cathode active particles therefrom, and a particle precursor prepared thereby.

BACKGROUND ART

The lithium-ion battery, originally commercialized in early 1990s, has come to dominate the energy storage market for hand-held, electronic consumer devices. This is because the battery is rechargeable and has high mass and volume energy density. Lithium-ion batteries are also being extensively investigated for electric vehicle applications currently. In electric vehicles, it is desirable that the battery cathode has high capacity, high power, improved safety, long cycle life, low toxicity and lower production costs. However, current cathode materials generally fail to meet all these requirements.

One reason why current cathode material fails to meet all the desired characteristics is that it is difficult to process complex multi-metal materials. As a matter of fact, one method suitable for processing certain transition-metal elements may not suit for processing other transition-metal elements which are desired to be integrated into the cathode particles. Hence, at such circumstance, other additives or agents would be needed to join the processing. For example, when preparing transition-metal precursor particles by a co-precipitation process, Ni—Mn—Co (abbr. as NMC) is desired to be combined with aluminum (abbr. Al) to form the cathode precursor particles. However, Al would not precipitate homogeneously with the Ni—Mn—Co under conventional hydroxide processing conditions. Hence, complicated additives and complexing agents would have to be added into the reactor and join the reaction therein. This would bring the following disadvantages: first, the costs would be increased due to the feeding of the additives and complexing agents; second, removal of such additives and complexing agents would need extra work and would lead to waste of water.

When synthesizing NMC particles by such co-precipitation method, several anion species would inevitably exist therein, such as oxalate, carbonate and hydroxide. Generally, hydroxide is the most preferable anion when using the co-precipitation method in industry, since it yields high-density particles. Such high-density particles are beneficial for high energy density cells. However, the existence of such anions would do no good for the improvement of cathode electrochemical performance since they would lead to changes in porosity, crystallite size, or local atomic ordering. To achieve high electrochemical performance, it is desirable to select suitable processing conditions for certain cathode element (i.e., Al) combinations based on electrochemical differences of various co-precipitation anions.

However, the addition of Al into the metal hydroxide cathode precursor is challenging. The solubility product constant (Ksp) of Al is orders of magnitudes lower than the pH ranges typically of NMC based particles, which result in fast and excessive precipitation and unusual secondary particle growth. As examples, four conventional methods of depositing Al are described below.

U.S. Pat. No. 9,406,930B discloses a method to deposit NCA (abbreviation of Ni—Co—Al) compositions as a shell on a core of NMC nucleates, during which the pH value is adjusted to a lower value to facilitate the deposition of Al. As a matter of fact, the pH value of below 10 is suitable for Al deposition. However, in such method, the pH value is 12 to 14 at a reference liquid temperature of 25° C., much higher than 10. Hence, such method results in uneven Al deposition and needs long reaction time, which leads to greatly cumulated particle surface area. None of these is desirable.

U.S. Pat. No. 8,216,676B2 discloses a method in which Al is deposited on $LiCoO_2$, $LiMn_2O_4$ and NMC cathode active material particles. During which the ratio of Co to the transition metal is controlled to be greater than 50% while adjusting the pH near 9. As a result, the coating is only present on the particle surface, not within the particle during the deposition, which is performed on a final material. Hence, such method fails to integrate Al within the particle structure, especially for Ni-rich materials with little or no Co present.

U.S. Pat. No. 9,876,226B provides precursor cathode particles which are dry-coated with smaller alumina particles. Such method relies on Al ions to diffuse into the structure during heating. However, for Ni-rich cathode materials, high heat treatment would result in formation of inactive rock-salts, which degrades the cathode performance. Hence, it is typically not desirable.

CN106207140A discloses a method in which the aluminum (Al) is added during co-precipitation to NC (abbreviation of Ni—Co) materials at the existence of a special complexing agent or chelator. Such complexing agent brings complexity to the process, and results in additional treatment of waste water. The feeding of organic chelator would adversely affect the reaction time. However, such method fails to avoid using such complexing agent or chelator.

Meanwhile, another problem to achieve high electrochemical performance is that during the preparation of active material, water produced from hydroxide-based cathodes would cause corrosion to processing equipment, which may damage the cathode particle performance, since high water vapor contents are associated with large grains observed on the particles after calcination. Generally, one method to solve such problem is to increase the volumetric flowrates of the reaction gas within the reactor. However, it could only accelerate the removal rate, but fails to mitigate the water generation. Further, such method also increases production costs, and could not reduce the downstream corrosion. In fact, in some cases the corrosion may increase due to the use of oxidative gas is much more. On one hand, using much oxidative gas could promote the water removal, on the other hand, it could also increase the corrosion to the processing unit. Hence, removal of some water generation under the premise of not leading to corrosion is still not achieved.

Technical Problem

It is difficult to add Al into metal hydroxide cathode precursor while achieving high electrochemical performance. Further, during the preparation of active particles, water produced from hydroxide-based cathodes would cause corrosion to processing equipment.

Technical Solution

The present disclosure provides a method for preparing transitional metal particle precursor, the transition metal particle precursor may be combined with metals such as lithium to form cathode active particles which can be used for lithium-ion batteries.

The method includes at least the following steps: feeding stream (b) into a reactor to adjust pH and to provide precipitating anions, feeding stream (a) to provide transitional-metal cations simultaneously, whereby the precipitating anions and the transitional-metal cations reacting to form a precipitated particle slurry; the stream (b) comprises at least a first anion composition $B_1$ and a second anion composition $B_2$, the first anion composition $B_1$ is switched to the second anion composition $B_2$ at a first switching time between the time the co-precipitation starts and the time the reaction ends, the stream (a) comprises at least one cation composition; and filtering, washing and drying the precipitated particle slurry to form the particle precursor.

The present disclosure further provides a method for preparing cathode active particles, which includes the following steps: preparing the particle precursor by the method above; mixing the particle precursor with a lithium source to form a mixture; and calcining the mixture to yield the cathode active particles.

Besides, the present disclosure further provides a particle precursor as prepared by the method above. The particle precursor includes a core-shell structure, a first anion composition $B_1$ is in the core, a second anion composition $B_2$ is in the shell enwrapped the first anion composition $B_1$, a first interface is formed between the first anion composition $B_1$ and the second anion composition $B_2$.

In one embodiment, the cathode active particle further includes a cation composition A which is both in the core and in the shell.

In another embodiment, the cathode active particle further includes a first cation composition $A_1$ and a second cation composition $A_2$, a second interface is formed between the first cation composition $A_1$ and the second cation composition $A_2$; the second interface coincides with the first interface, or the second interface is different from the first interface.

Advantageous Effects

The method of the present disclosure has the following advantages: firstly, forming a particle precursor that has more than one anion within the structure, and the anion has a compositional variation (i.e., core-shell) between the interior and exterior of the particle. In one embodiment, the cation distribution may not change over the entire particle. In another embodiment, the cation distribution may change in different portions of the particle. In yet another embodiment, the cation distribution may also have compositional variation in the particle. Secondly, using the anion variation to preferentially precipitate different cation materials into the particle core or shell. During the precipitation, the precipitation conditions pH may change gradually or immediately upon changing the anion composition. Thirdly, avoid using organic chelating additives to alter the precipitation rates for desired cations into the material core or shell, especially at the conditions when adding Al into the cathode precursor. Finally, during the process where the precursor is calcinated into final product, the generation of water is reduced by substituting the hydroxide anion that commonly exists in cathode particles by other $CO/CO_2$ generating species

BEST MODE

Figure 1:
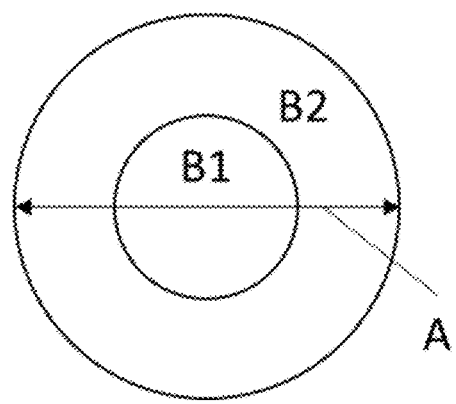
FIG. 1 shows a schematic view of a particle precursor which has a first anion $B_1$ in the core and a second anion $B_2$ in the shell enwrapped the first anion $B_1$, and a uniform cation A dispersed within the whole particle.

The present disclosure will now be described more specifically with reference to the following embodiments. It is to be noted that the following descriptions of preferred embodiments of this invention are presented herein for purpose of illustration and description only. It is not intended to be exhaustive or to be limited to the precise form disclosed.

In the embodiments below, particle precursors with anion-changed core-shell structures will be prepared after a co-precipitation reaction, and the solution volume where the reaction takes place is defined as a precipitation zone.

The method for preparing such anion-changed core-shell structured particle precursors includes the following steps: firstly, vacuuming the precipitation zone and/or filling with He, $N_2$ or Ar gas, for example, blanketing or bubbling the precipitation zone by He, $N_2$ or Ar gas.

Next, introducing a stream (b) into a reactor for providing precipitating anions, feeding stream (a) for providing transitional-metal cations simultaneously, whereby the precipitating anions and the transitional-metal cations reacting to form a precipitated particle slurry; the stream (b) includes at least a first anion composition $B_1$ and a second anion composition $B_2$, the first anion composition $B_1$ is switched to the second anion composition $B_2$ at a first switching time between the time the co-precipitation starts and the time the reaction ends, the stream (a) includes at least one cation composition; filtering, washing and drying the precipitated particle slurry to yield the particle precursor.

Optionally, additional streams (e . . . z) may also be introduced into the precipitation zone to add additional species to the reaction, or to remove solvent through an in-situ thickening device.

Further, mixing the active particle precursors with a lithium source to form a mixture, and calcining to yield cathode active particles. During such calcination, lithiation reaction occurred and water removed from the mixture.

Each precipitation zone volume is defined as the volume of a single mixed vessel or the sum of several processing vessels, pumps, or solid-liquid thickening devices connected in parallel.

The precipitation zone can generally be described by the following mass balance equation: $d(\rho_c V)/dt = \Sigma_{\alpha=a}{}^z F_\alpha \rho_\alpha$, where "$\alpha$" represents for the inlet/outlet streams (a) to (z), "$\rho_\alpha$" represents for a fluid density, "V" refers to a volume of the precipitation zone, "$F_\alpha$" refers to a flowrate of the volumetric, "$\rho_\alpha$" is a density of inlet streams; "$\rho_c$" is a density of accumulating fluid in the reactor which changes with time.

In one embodiment, only one precipitation zone is used, and the co-precipitation reactions occur during batch operation, the mass balance equation is defined as $d(\rho_c V)/dt \neq 0$.

In another embodiment, multiple precipitation zones are linked in series, $d(\rho_c V)/dt \neq 0$. In still another embodiment, multiple precipitation zones are linked in series, $d(\rho_c V)/dt = 0$.

In the present disclosure, the cathode active particles are concentration gradient materials produced by a co-precipitation reaction, size of the cathode active particles is proportional to the reaction time, and the composition deposited onto a particle at a particular time is directly related to the inlet ion compositions.

In the process of the present disclosure, the stream (b) includes at least one anion composition $B_i$ for precipitation with a concentration of 0.001-14 (mol anion/L) and includes at least one species selected from the group consisting of NaOH, $Na_2CO_3$, $NaHCO_3$, $Na_2C_2O_4$, LiOH, $Li_2CO_3$, $LiHCO_3$, $Li_2C_2O_4$, KOH, $K_2CO_3$, $KHCO_3$, $K_2C_2O_4$ or some combination of the species listed above. Meanwhile, the stream (b) functions to provide anions which would enter the precipitation particles. Further, the stream (b) includes more than one species. In one embodiment, the stream (b) at least includes two species, i.e., a first anion composition $B_1$ and a second anion composition $B_2$, at a particular time t, the stream (b) changes from the first anion composition $B_1$ to the second anion composition $B_2$. Because of this, the anions deposited into the particle slurry would be suddenly changed with different anions.

For example, in one embodiment, the stream (b) has an initial anion composition, i.e., the first composition $B_1$. As the reaction time proceeds, the stream (b) changes from the first anion composition $B_1$ to the second anion composition $B_2$ at a first switching time t, where the switching time t exists between the time the co-precipitation starts and the time the reaction ends. In detail, in one embodiment, the first anion composition $B_1$ is a solution entirely configured from hydroxide salts. In one embodiment, the second anion composition $B_2$ is at least one selected from the group consisting of carbonate ($[CO_3]$ salts), oxalate ($[C_2O_4]$ salts), hydroxide ($[OH]$ salts), or some combination of the species listed above.

In one embodiment, the first switching time t when switching the first anion composition $B_1$ to the second composition $B_2$ is greater than 50% of the reaction time. In another embodiment, the first switching time t when switching the first composition $B_1$ to the second composition $B_2$ is after 75% of the reaction time.

Besides, the flowrate and concentration of the stream (b) may be constant or may change during the reaction. In one embodiment, the flowrate and concentration change may occur at the same first switching time t when the first anion composition $B_1$ is changed to the second anion composition $B_2$ during the co-precipitation.

For example, in one embodiment, the first composition $B_1$ is sodium hydroxide to provide hydroxide needed in the particles, the second composition $B_2$ is sodium carbonate functions to provide carbonate needed in the particles. At half of the total reaction time, the first composition $B_1$ is changed into the second composition $B_2$.

In the present disclosure, stream (a) above functions to provide transitional-metal cations. Stream (a) has at least one cation composition species. In one embodiment, stream (a) has s first cation composition $A_1$ and a second composition $A_2$. Stream (a) includes the cations for precipitation with a concentration from 0.001-6 (mol cation/L). The cations provided by stream (a) is at least one selected from the group consisting of Mg, Ca, Zr, Ti, V, Cr, Mn, Fe, Co, Ni, Cu, Al or some combination of the species listed above. The anion provided by stream (a) is in a form of sulfate, carbonate, chloride, nitrate, fluoride, oxide, hydroxide, oxyhydroxide, oxalate, carboxylate or acetate, phosphate or borate. For example, in one embodiment, stream (a) is Ni:Mn:Co 4:3:3 metal salt. In another embodiment, the stream includes Ni:Co:Mn 4:4:2 metal hydroxide and Ni:Co 9:1 metal salt.

In one embodiment, stream (a) has a first cation composition $A_1$ at the start of the reaction, the first cation composition $A_1$ acts as an initial cation composition and has certain concentration. As the reaction time proceeds, the composition changes from the first cation composition $A_1$ to a second cation composition $A_2$ at a second switching time t, where t exists between the time the co-precipitation starts and the time the reaction ends.

In one embodiment, the cation composition changes from the first composition $A_1$ to the second composition $A_2$ gradually as a gradient with time. In another embodiment, the cation composition changes from the first composition $A_1$ to the second composition $A_2$ abruptly, as a core-shell interface. The second switching time when $A_1$ switches to $A_2$ can occur at any moment. In one embodiment, the time when the cation composition switches from the first composition $A_1$ to the second composition $A_2$ does not coincide with the time when the anion composition change from $B_1$ to $B_2$.

In one embodiment, $A_1 = A_2$. In this embodiment, there is only one stream of cation composition fed into the reactor from the beginning to the end. For example, in one embodiment, only a solution of Ni:Co 90:10 metal sulfate solution is fed into the reactor. At this circumstance, there is only Ni, Co cations exists in the whole particle. As an example, FIG. 1 shows a schematic view of the structure of the cathode active particles. FIG. 1 shows that the particle precursor has a core-shell structure, wherein the anion core $B_1$ (e.g., hydroxide) is in the center, and the anion shell $B_2$ (e.g., carbonate) enwrapped the anion core $B_1$, and the particle has a uniform cation composition A.

Figure 2:
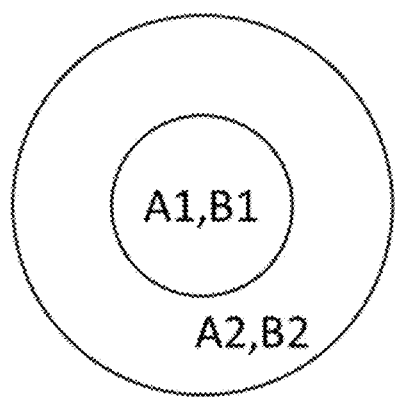
FIG. 2 shows a schematic view of a particle precursor which has a first anion $B_1$ in the core and a second anion $B_2$ in the shell enwrapped around the first anion $B_1$, and further has a first cation $A_1$ in the core and a second cation $A_2$ in the shell, wherein the interface between $B_1$ and $B_2$ coincide with the interface between $A_1$ and $A_2$.

In another embodiment, the cation composition changes from the first composition $A_1$ to the second composition $A_2$ for feeding different transitional-metal combinations will occur at the same time when the anion composition changes from the first composition $B_1$ to the second composition $B_2$ for feeding different anions deposited into the active particles. In this embodiment, since the cation composition and the anion composition changes at the same time, the deposited active particles would have a core-shell structure, the core of the particle includes the first cation composition $A_1$ and the first anion composition $B_1$, and the shell of the particle enwraps around the core and includes the second cation composition $A_2$ and the second anion composition $B_2$. FIG. 2 shows a schematic view of the particle precursor where the first cation $A_1$ and the first anion $B_1$ is in the core, and the second cation $A_2$ and the second anion $B_2$ is in the shell.

Further, the first cation composition $A_1$ and the second cation composition $A_2$ has a cation ratio of $Ni_xMn_yCo_zMe_{1-x-y-z}$, where $x+y+z \geq 0.9$, $z \leq 0.2$, and "Me" refers to one or more additional metal elements selected from the group consisting of Mg, Ca, Zr, Ti, V, Cr, Fe, Cu and Al. In one embodiment, $z<0.05$. In another embodiment, $z=0$. In another embodiment, "Me" is Al, Mg, Zr, Ti or some combination of the species listed above.

Under the feed conditions discussed above, a precipitated active particle will be collected after time $t_f$, the active particle is expressed as $(Ni_xMn_yCO_zMe_{1-x-y-z})(CO_3)_a(OH)_{2-2a}$ where $x+y+z \geq 0.9$, $z \leq 0.2$, $0 \leq a \leq 1$, "Me" is additional metal elements except Ni, Mn and Co, such as Mg, Ca, Zr, Ti, V, Cr, Fe, Cu and Al.

In some embodiments, the first cation composition $A_1$ and the second cation composition $A_2$ are different. In such embodiments, the first cation composition $A_1$ has a cation ratio of $Ni_xMn_yCo_zMe_{1-x-y-z}$, where $x+y+z \geq 0.9$, $0.75 \leq x \leq 1$; $0 \leq z \leq 0.1$, "Me" refers to one or more additional metal elements selected from the group consisting of Mg, Ca, Zr, Ti, V, Cr, Fe, Cu and Al. The second cation composition $A_2$ has a cation ratio of $Ni_xMn_yCo_zMe_{1-x-y-z}$, where $x+y+z \geq 0.9$, $0.3 \leq x \leq 0.7$; $0.25 \leq y \leq 0.5$, "Me" refers to one or more additional metal elements selected from the group consisting of Mg, Ca, Zr, Ti, V, Cr, Fe, Cu and Al.

In one embodiment, by changing the composition of stream (a), cation composition would be changed continuously for all or part of the material, thus forming a cathode whose cation is made of concentration gradient transitional-metals. In one embodiment, the transitional-metals, i.e., the cations, change during the whole process for preparing the entire particle. In another embodiment, only a portion of the particle make linear gradient shell transitional-metal particles with a core-shell anion species, others remain same. In still another embodiment, only a portion of the particle make non-linear gradient shell transitional-metal particles with a core-shell anion species. In yet another embodiment, only a portion of the particle make multi-slope gradient shell transitional-metal particles with a core-shell anion species. In still another embodiment, only a portion of the particle make core-gradient shell transitional-metal particles with a core-shell anion species. In yet another embodiment, only a portion of the particle make core-gradient-shell transition metal particles with a core-shell anion species.

In some embodiments, to yield the full concentration gradient or core-gradient shell particle, the transitional-metal feed, i.e., the stream which provides the first cation composition $A_1$ and the second cation composition $A_2$ has a cation ratio of $Ni_xMn_yCo_zMe_{1-x-y-z}$, where $x+y+z \geq 0.9$, $z \leq 0.2$, "Me" refers to one or more additional metal elements selected from the group consisting of Mg, Ca, Zr, Ti, V, Cr, Fe, Cu and Al, the first cation composition $A_1$ is selected from $0.85 \leq x \leq 1$; $0 \leq z \leq 0.1$, the second cation composition $A_2$ is selected from $0.4 \leq x \leq 0.7$; $0.25 \leq y \leq 0.5$.

Figure 3:
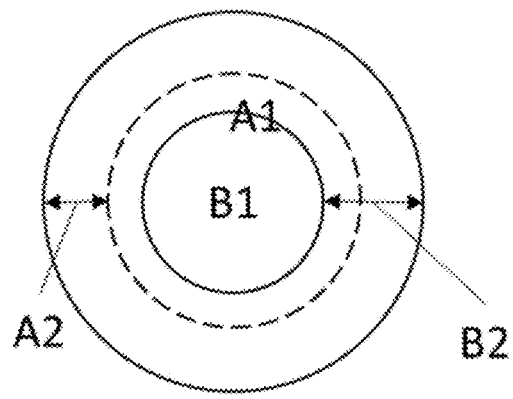
FIG. 3 shows a schematic view of a particle precursor which has a first anion $B_1$ in the core and a second anion $B_2$ in the shell enwrapped around the first anion $B_1$, and further has a first cation $A_1$ in the core and a second cation $A_2$ in the shell, wherein the interface between $B_1$ and $B_2$ does not coincide with the interface between $A_1$ and $A_2$.

In one embodiment, the key processing points for the cation composition, the start of gradient in core-gradient shell particles or the change in slope for multi-slope cathode particles can occur at any time during the particle process. In this embodiment, the switching from the first cation composition $A_1$ to the second cation composition $A_2$ does not keep step with the switching from the first anion composition $B_1$ to the second anion composition $B_2$. FIG. 3 shows a schematic view of the particle precursor. Such particle precursor is produced by a method wherein the first anion composition $B_1$ is switched to the second anion composition $B_2$ at a time different from that switching the first cation composition $A_1$ to the second cation composition $A_2$. Hence, for the anions and the cations, the interface of the anions $B_1$ and $B_2$ does not coincide with the interface of the cations $A_1$ and $A_2$.

Figure 4:
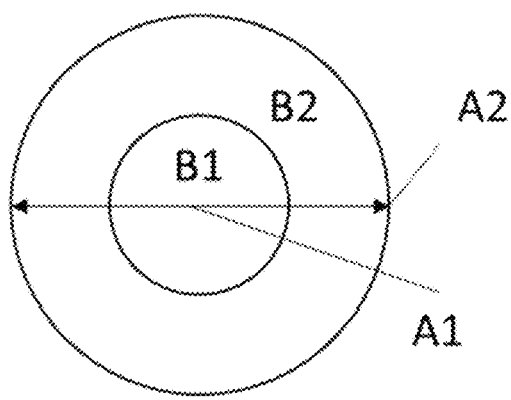
FIG. 4 shows a schematic view of a particle precursor which has a first anion $B_1$ in the core and a second anion $B_2$ in the shell enwrapped around the first anion $B_1$; the cations $A_1$ and $A_2$ in the particle have a concentration gradient wherein the cation $A_1$ gradually switched to the cation $A_2$.
Figure 5:
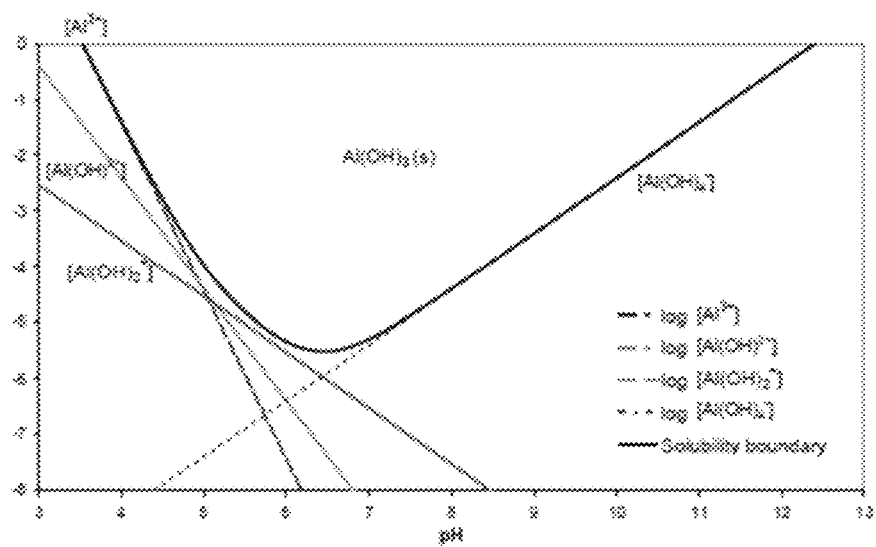
FIG. 5 shows solubility product constant (Ksp) of different hydroxides and carbonates at 25° C.

In another embodiment, as shown in FIG. 4, for the anions $B_1$ and $B_2$, since $B_1$ is switched to $B_2$ at certain time, there is a clear interface of $B_1$ to $B_2$ in the particle. For the cations, since the cation $A_1$ is initiated at the beginning and the cation $A_1$ is gradually switched to $A_2$ during the whole process, there is no clear interface between $A_1$ and $A_2$ in the particle.

In one embodiment, the core-gradient shell initiates the concentration gradient when $B_1$ switches to $B_2$. In another embodiment, the slope change for multi-slope gradient particles undergoes the change when $B_1$ equals $B_2$.

The stream $(e_i \ldots z_i)$ includes additional solvents, surface acting agents or de-foaming agents. For example, the solvent is at least one selected from ethanol, isopropanol, ionic liquids and so on. The surface acting agents may be alky sulfates such as sodium dodecyl sulfate (SDS), alkyl trimethyl ammonia species such as cetyltrimethyl ammonia (CTAB), glycols, glycerides. The de-foaming agent is ethanol.

In one embodiment, dopant is also fed into the reactor. The dopant refers to salts of metal elements other than Ni, Co and Mn, labeled as "Me". In one embodiment, the dopant species is $Al_2(SO_4)_3$. As a dopant element, $Al^{3+}$ would be precipitated together with other cations. Since different cations suit for different pH conditions, adjusting the pH affects would be inevitable. This would lead to the adjusting to Ksp, and the Ksp of different anions would form different precipitates. Hence, it can be selected by using different pH to match with suitable anion precipitation. Other dopants could also be used if the pH is suitable.

The pH of each precipitation zone is maintained at a range of 7-13. In one embodiment, the pH is at a range of 9.5-12.5 when precipitating hydroxides and at a range of 7-10 when precipitating carbonates.

The precipitation zone agitated vessel is well mixed during the feeding, and has a Re>6,400, with a mixing time from 0 to 1,200 seconds. In one embodiment, the mixing time is 0 to 120 seconds. In another embodiment, the mixing time is 0 to 45 seconds. The precipitation zone temperature is maintained between 30 and 800° C. In one embodiment, the precipitation zone temperature is maintained between 45 and 600° C.

Table 1 shows the solubility product constant ($K_{sp}$) of carbonate and hydroxide materials. As can be seen from table 1 that the solubility product constant ($K_{sp}$) of carbonate is larger than that of hydroxide. Theoretically, more hydroxide materials precipitate than the carbonate materials under the same pH. The $K_{sp}$ and pH are usually two main factors determining the solubility of a substance. In table 1, "(II)" means a valence of the metal element in the precipitation is divalent.

TABLE 1

Solubility Product Constants near 25° C.

| Ionic Compound | $K_{sp}$ | Ionic Compound | $K_{sp}$ |
|---|---|---|---|
| Aluminum hydroxide | $1.3 \times 10^{-33}$ | Aluminum carbonate (not stable) | N/A |
| Cobalt(II) hydroxide | $1.6 \times 10^{-15}$ | Cobalt(II) carbonate | $1.4 \times 10^{-13}$ |
| Magnesium hydroxide | $1.8 \times 10^{-11}$ | Magnesium carbonate | $3.5 \times 10^{-8}$ |
| Manganese(II) hydroxide | $1.9 \times 10^{-13}$ | Manganese(II) carbonate | $1.8 \times 10^{-11}$ |
| Nickel(II) hydroxide | $2.0 \times 10^{-15}$ | Nickel(II) carbonate | $6.6 \times 10^{-9}$ |

In another embodiment, the pH is constant from 9-10.5 regardless of the anion species being fed for the co-precipitation. In such embodiment, both the first anion composition $B_1$ and the second anion composition $B_2$ have a pH at a range of 9-10.5. In some embodiments, the pH changes when the anion composition changes from $B_1$ to $B_2$. For example, the pH changes when hydroxide is switched to carbonate, since the first anion composition $B_1$ is hydroxide which has a pH of 10-14, and the second anion composition $B_2$ is carbonate which has a pH much lower.

In some embodiments, the pH gradually changes during the course of the entire reaction, or for a specified duration of the reaction.

After sufficient time till the precipitation ends, the precipitation particles are deposited from the precipitation zone to from a particle slurry, which is collected in a hold-up tank or directly fed to a solid-liquid filtration device to obtain precipitated particles. The filtration device may be a plate and frame filter, candlestick filter, centrifuge, vacuum drum filter, pressure drum filter, hydrocyclone, nutsche filter, clarifier or some combination of devices. Next, the filtered precipitated particles (i.e., the filter cake) are washed to remove byproduct salts from the precipitation reactions.

And then, the precipitated particles are dried under vacuum at an atmosphere of N2, Ar or air for 3-24 hours between 80-200° C., thus forming a precipitated particles precursor.

Once dried, the precipitated particles precursor is contacted and well mixed with a lithium source to form a mixture. The lithium source is selected from lithium hydroxide (i.e., LiOH), LiOH·H$_2$O, lithium carbonate (Li$_2$CO$_3$), LiNO$_3$, lithium acetate, lithium metal or Li$_2$O. In one embodiment, the lithium source is lithium hydroxide. In another embodiment, the lithium source is lithium carbonate.

In one embodiment, a mole ratio between Li from the lithium source and the metal cation from stream (a) is in a range of 0.5-1.5. In another embodiment, the mole ratio is 0.9-1.15. In still another embodiment, the mole ratio is 1.01-1.10.

After the lithium source and the precipitated particles precursor are mixed uniformly to form a mixture, calcine the mixture under a temperature of 300-950° C., wherein multiple hold temperatures and ramp rates may be used. For example, firstly controlling the temperature at 300-500° C. for 2-20 hours, and then raising temperature to 700-850° C. and maintaining for 2-20 hours. The ramp rate during heating is from 0.5 to 10 degrees per minute. In another embodiment, the ramp rate during heating is 2-5 degrees per minute. The calcination time is from 2 hours to 48 hours.

During calcination in the method above, water may generate between 0-800° C. during the calcining step. Since during calcination, the precursors underwent decomposition and/or oxidation to yield the expected products, the cathode active particles. During the calcining step, the following reaction occurred based on formulas 1-3, wherein M(OH)$_2$, M(CO$_3$) and M(C$_2$O$_4$) are the precipitated particles from the solution, M refers to metals:

$$M(OH)_2 = MO_x + H_2O \quad \text{(formula 1)}$$

$$M(CO_3) = MO_x + CO/CO_2 \quad \text{(formula 2)}$$

$$M(C_2O_4) = MO_x + CO/CO_2 \quad \text{(formula 3)}.$$

Tables 2 and 3 show moles of water evolved from calcination of 1 mol of M(OH)$_2$/MCO$_3$ precursor (i.e., lithiation process) when using different lithium source. We can get that while the exact water release is complicated by the choice of lithium source, it is apparent that hydroxide precursor particles will generate water while carbonate and oxalate anion presence will result in some carbon-oxide species.

TABLE 2

Moles of water evolved from calcination of 1 mol M(OH)$_2$/MCO$_3$ precursor when the lithium source is LiOH•H$_2$O

| 1 mol cathode precursor | M(OH)$_2$ | MCO$_3$ | M(OH)$_2$/MCO$_3$ (1:1) | M(OH)$_2$/MCO$_3$ (1:1) | M(OH)$_2$/MCO$_3$ (1:1) | M(OH)$_2$/MCO$_3$ (1:1) |
|---|---|---|---|---|---|---|
| lithiation | | | Water evolved from calcination (mol) | | | |
| 90% | 2.25 mol | 1.35 mol | 1.80 mol | 1.95 mol | 2.03 mol | 2.07 mol |
| 100% | 2.50 mol | 1.50 mol | 2.00 mol | 2.17 mol | 2.25 mol | 2.30 mol |
| 103% | 2.58 mol | 1.55 mol | 2.06 mol | 2.23 mol | 2.32 mol | 2.37 mol |
| 110% | 2.75 mol | 1.65 mol | 2.20 mol | 2.38 mol | 2.48 mol | 2.53 mol |
| 120% | 3.00 mol | 1.80 mol | 2.40 mol | 2.60 mol | 2.70 mol | 2.76 mol |
| 130% | 3.25 mol | 1.95 mol | 2.60 mol | 2.82 mol | 2.93 mol | 2.99 mol |

TABLE 3

Moles of water evolved from calcination of 1 mol
M(OH)₂/MCO₃ precursor when the lithium source is Li₂CO₃

| 1 mol cathode precursor lithiation | $M(OH)_2$ | $MCO_3$ | $M(OH)_2/MCO_3$ (1:1) | $M(OH)_2/MCO_3$ (1:1) | $M(OH)_2/MCO_3$ (1:1) | $M(OH)_2/MCO_3$ (1:1) |
|---|---|---|---|---|---|---|
| | Water evolved from calcination (mol) | | | | | |
| 90%  | 0.90 mol | 0.00 mol | 0.45 mol | 0.60 mol | 0.68 mol | 0.72 mol |
| 100% | 1.00 mol | 0.00 mol | 0.50 mol | 0.67 mol | 0.75 mol | 0.80 mol |
| 103% | 1.03 mol | 0.00 mol | 0.52 mol | 0.69 mol | 0.77 mol | 0.82 mol |
| 110% | 1.10 mol | 0.00 mol | 0.55 mol | 0.73 mol | 0.83 mol | 0.88 mol |
| 120% | 1.20 mol | 0.00 mol | 0.60 mol | 0.80 mol | 0.90 mol | 0.96 mol |
| 130% | 1.30 mol | 0.00 mol | 0.65 mol | 0.87 mol | 0.98 mol | 1.04 mol |

The content of water evolved from the cathode particle precursor and Li precursor will be decreased when an anion composition gradient material is prepared, because instead of $H_2O$, $CO/CO_2$ will be evolved partially during the decomposition reactions, just as formulas 2 and 3 show.

The calcination is conducted under atmosphere selected from $N_2$, air, dried air, oxygen or some combination thereof. The calcination temperature is critical for concentration gradient materials, since too high, too long, or a combo of the two may cause so much cation diffusion that a gradient is no longer present in the final cathode active particles.

To characterize and analysis the precipitated cathode active particles which have concentration gradient elements, SEM, porosimetry, pycnometer and particle size distributions can be utilized. The presence of a concentration gradient can be confirmed by depth profiling a particle or via cross-sectioning a particle and using an EDS line scan or electron microprobe analyzer.

The precipitated and cathode active particles can be characterized using the particle size distribution D10, D50, D90. The Sauter mean diameter $d_{32}$ can be calculated by the formula $$d_{32} = \frac{\sum_{k=1}^{N} n_k d_k^3}{\sum_{k=1}^{N} n_k d_k^2},$$

wherein "$n_k$" is the relative fraction and "$d_k$" is the bin diameter from the particle size distribution. The particle size distribution can be collected via a light scattering instrument. In one embodiment, the prepared cathode active particles have a Sauter mean diameter at a range of 0.5-30 μm. In another embodiment, the Sauter mean diameter is at a range of 1-15 μm.

The porosity of the prepared cathode active particles can be analyzed using BET and BJH analysis.

The prepared cathode active particles can be used in lithium-ion battery. In detail, in one embodiment, the prepared cathode active particles are mixed with a binder and conductive particles to form a mixture slurry. The mixture slurry is further cast onto a metallic foil to form a cathode electrode. The cathode electrode can be used in a lithium-ion battery.

To test the cathode material performance, galvanotactic charge-discharge tests can be performed. The material capacity, cycle retention, rate performance and cycle efficiency can all then be determined.

MODE FOR INVENTION

Example 1

Figure 6:
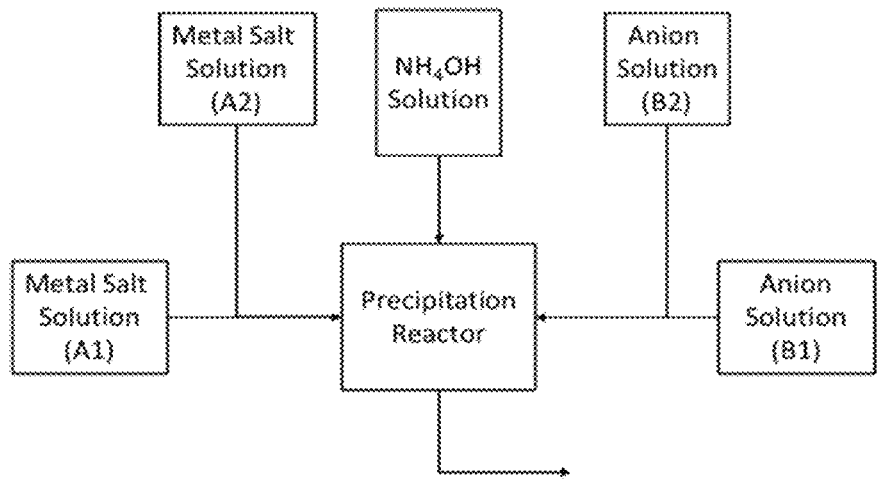
FIG. 6 shows a schematic view of the reaction device to form the particle precursors in the application.

FIG. 6 shows a schematic view of the reaction device to form the cathode active particles. As shown in FIG. 6, the reaction is conducted with the following steps:

Firstly, placing a 10 L glass reactor into a jacketed stirred tank, filling the glass reactor with 0.8M ammonia hydroxide water, and starting stir at 350 rpm with a mixing shaft. Feeding nitrogen gas into the water and bubbling to deoxygenate the water, meanwhile controlling a temperature of the reactor solution at 500 C, and a pH of the reactor to 11.9.

Preparing a 1 L solution of 2M first transitional-metal sulfate solution which is made of nickel sulfate hexahydrate and cobalt sulfate heptahydrate, in which a mole ratio of Ni:Co is 90:10. Preparing a 2M second transitional-metal sulfate solution with a mole ratio of Ni:Mn:Co being 4:4:2.

Feeding the first transitional-metal sulfate solution, aqua ammonia solution, and sodium hydroxide solution into the reactor while stirring at 350 rpm and performing reaction therein. In detail, pumping the first transitional-metal sulfate solution into the reactor at a flowrate of 125 mL/hr, simultaneously pumping a 9.6M aqua ammonia solution thereinto at a flowrate of 16 mL/hr. Meanwhile, pumping a 10.6M sodium hydroxide solution into the reactor to maintain the pH at 11.9, in which the sodium hydroxide solution is pumped by a dosing pump that is in a control loop with the pH controller. The reaction lasted 8 hours.

After that, turning off the stirring, and depositing particles from the solutions. After finishing the deposition, pumping away the supernatant until only 750 mL remained in the reactor. Adding water into the reactor to form a slurry solution until a volume of the slurry solution reaching 3 L.

And then, restarting to stir the slurry solution at 350 rpm, feeding 2M sodium carbonate instead of the sodium hydroxide, and controlling the pH to change to 9 by setting the pH controller. Meanwhile, feeding the aqua ammonia solution with a concentration of 0.008M instead of 9.6M, and feeding the 2M second transitional-metal sulfate solution whose mole ratio of Ni:Mn:Co being 4:4:2 to form a mixed solution. Proceeding the reaction in the mixed solution for 8 hours, during the reaction, precipitated particles are deposited from the mixed solution. After reaction, dividing the mixed solution into two parts, one part is collected for further use in Example 2.

Filtering the other part of the mixed solution to remain the precipitated particles and washing the precipitated particles with water. Then drying the particles at 100° C. to form a particles precursor. Once dried, mixing the particles precursor with LiOH·H₂O at a ratio of 1.03:1, and then calcining at 840° C. for hours to yield cathode active particles. Such particles have a core-shell structure.

Figure 7:
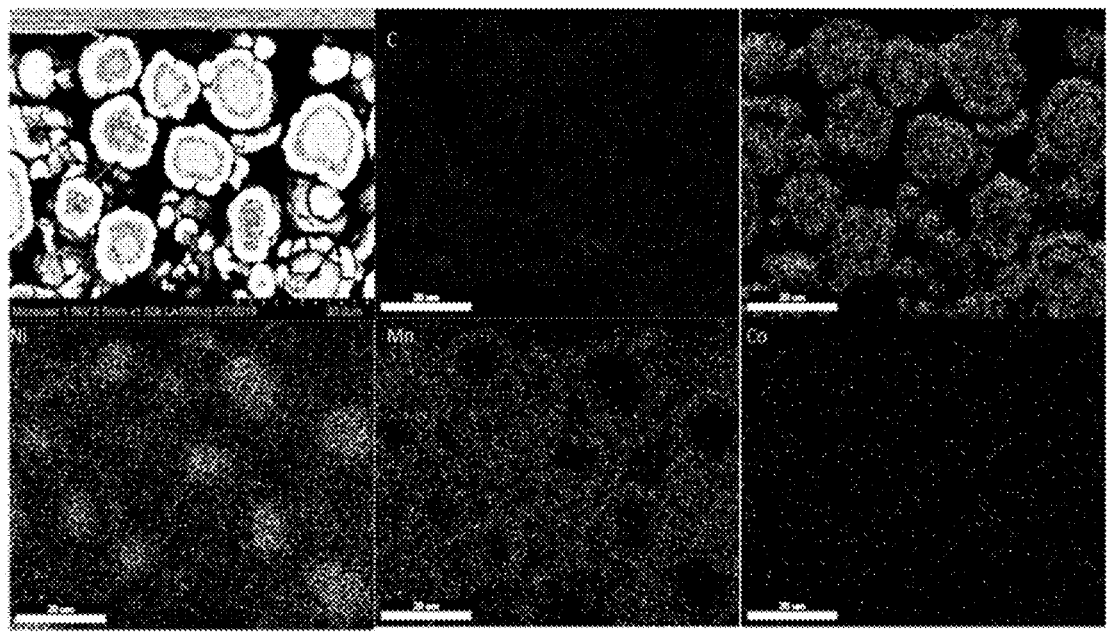
FIG. 7 shows SEM images of cross-sectional particle precursors of Example 1.

Physical characterization of the cathode active particles in Example 1 was also tested. Firstly, collecting the precursor and the first cathode active particles separately by a Malvern Mastersizer 2000light scattering instrument, loading 20 g of each powder into a 25 ml graduated cylinder and tapping for 2000 taps using a PF-300B, and collecting SEM images of particles cross section on a JEOL JSM-639OLV separately. FIG. 7 shows SEM images of cross-sectional particles of Example 1, such SEM images can also show the element distribution (abbr. as ED) of C, O, Ni, Mn and Co. As shown in FIG. 7, a core exists in each particle, such core is made of hydroxide, and having no Mn therein, while Mn is presented outside the core. The reason is that Mn correlates with carbonate anion, while at the beginning there is only sulfate anion existed in the solution. After that, carbonate anion is fed into the reaction instead of sulfate anion. Besides, the SEM images also shows that carbon was weak due to the poor scattering ability of carbon, but some regions appears to show low and higher intensity that correlate with the expected shell. The image which marked with "C" in the left top corner shows the image of carbon.

Example 2

Feeding aluminum sulfate ($Al_2(SO_4)_3$) solution into the collected part of the mixed solution wherein the Al content was 0.5 mol % of the second transitional-metal sulfate solution whose Ni:Mn:Co being 4:4:2. Reacting for another 5 hours. During this reaction, $Al^{3+}$ cation, together with Ni, Mn, Co cations, are also participated in the reaction with anions of the mixed solution to form precipitated particles from the solution.

After the reaction ends, filtering the solution to get the precipitated particles and washing the precipitated particles with water. Drying the precipitated particles at 100° C. to form a particle precursor. Once dried, mixing the particles precursor with $LiOH \cdot H_2O$ at a ratio of 1.03:1, and then calcining at 840° C. for hours to yield cathode active particles.

Figure 8:
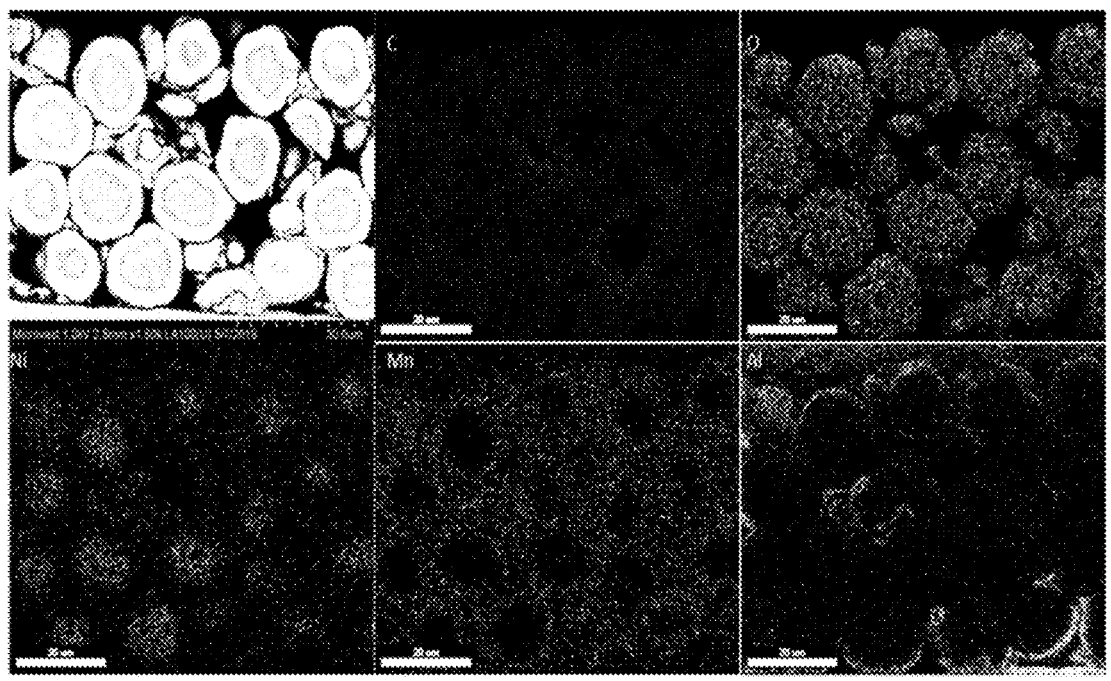
FIG. 8 shows SEM images of cross-sectional particle precursors of Example 2.

Physical characterization of the cathode active particles in example 2 was also tested by a similar method as that in Example 1. FIG. 8 shows SEM images of cross-sectional particle precursors prepared in Example 2. Further, element distribution of the particles prepared in Example 2 is also analyzed through the SEM images, and table 4 shows the element distribution obtained by SEM images of FIG. 8. The last image of FIG. 8 shows the element distribution of Al.

TABLE 4

Element distribution of C, O, Ni, Mn and Co.

| Element | C | O | Al | Mn | Co | Ni |
|---|---|---|---|---|---|---|
| Weight % | 10.64 | 35.31 | 3.57 | 20.71 | 10.20 | 19.57 |
| Atomic % | 21.55 | 53.72 | 3.22 | 9.17 | 4.21 | 8.11 |

It can be seen that there is a strong presence of Al not entering the core of the particles, which is mainly located at the outer shell of the particles. Besides, the density of the particles is uneven due to depth effects during the scanning.

In this example, the aluminum sulfate, especially the $Al^{3+}$ acts as a dopant. During co-precipitation, $Al^{3+}$ can be added to the cathode particle precursor under the condition without using an additional organic chelating additive to slow the precipitation kinetics. The cathode particle can be Ni-rich material wherein a ratio of Ni to transition metal ratio is larger than 0.7. Further, the cathode particle still has the Al dopant without using of an organic chelating additive. The deposition of the $Al^{3+}$ into the particle can adjust the thickness and depth based upon the switching point for feeding the anions and for feeding $Al^{3+}$.

This shows that dopants incompatible with the core anion transitional-metal species in the processing conditions can be easily added to the precursor particles in the shell. And vice versa, where dopants that are only compatible with the core anion under processing conditions can be added to the particle before switching to an incompatible processing location for the shell. Because of this, the particle precursors are formed to have core-shell structure, and the core and shell have different colors and there is an interface between the core and the shell.

Comparative Example 1

Firstly, loading 2 L of 0.9M aqua ammonia solution into a 5 L jacketed glass reactor whose temperature set at 50° C. Stirring the solution at 500 rpm, and bubbling by nitrogen.

Preparing a 2M third transitional-metal sulfate solution by feeding nickel sulfate hexahydrate, cobalt sulfate heptahydrate, manganese sulfate monohydrate and aluminum sulfate hydrate, in which a mole ratio of Ni:Co:Mn:Al being 70:10:10:10. Feeding the third transitional-metal sulfate solution into the reactor at a flowrate of 150 mL/hr, simultaneously feeding 5M aqua ammonia solution into the reactor at 45 mL/hr. Meanwhile, feeding 4M sodium hydroxide solution into the reactor to maintain the pH at 11.9.

After the reaction finished, filtering and washing the solution with water. In this way, cathode active particles are prepared.

Figure 9:
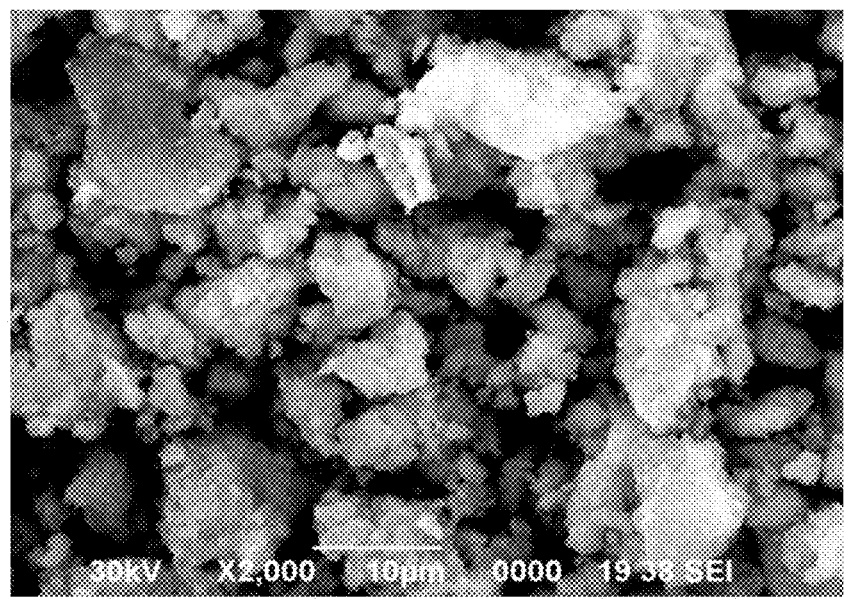
FIG. 9 shows SEM images of cross-sectional particle precursors of comparative example 1.

Physical characterization of the cathode active particles in example 2 was also tested by a similar method as that in Example 1. FIG. 9 shows SEM images of cross-sectional particles prepared in comparative example 1. As shown in FIG. 9, no spherical particles were formed during the reaction, and the solution was very difficult to filter, almost impossible. This indicates that there were excessive fines formed during the reaction, in which the fines are mainly strong nucleation of aluminum hydroxide species. No core-shell structure is formed in comparative example 1.

Electrochemical Characterization:

Preparing coin cells to test the electrochemical characterization of cathode active particles prepared in Example 1 and 2. Firstly, mixing 90 wt % of the prepared cathode active particles in Examples 1 or 2 separately, 5 wt % Super P and 5 wt % PVDF in NMP solvent (N-Methyl pyrrolidone) to form a cathode slurry. Next, casting the cathode slurry onto an aluminum foil using a notched blade. Once dried, pressing to a thickness of 60 μm to yield a cell. Punching several such cells into 13 mm disks to form coin cells with a lithium foil anode and a 1M $LiPF_6$ EC/DEC electrolyte. After that, sealing the cells.

Figure 10:
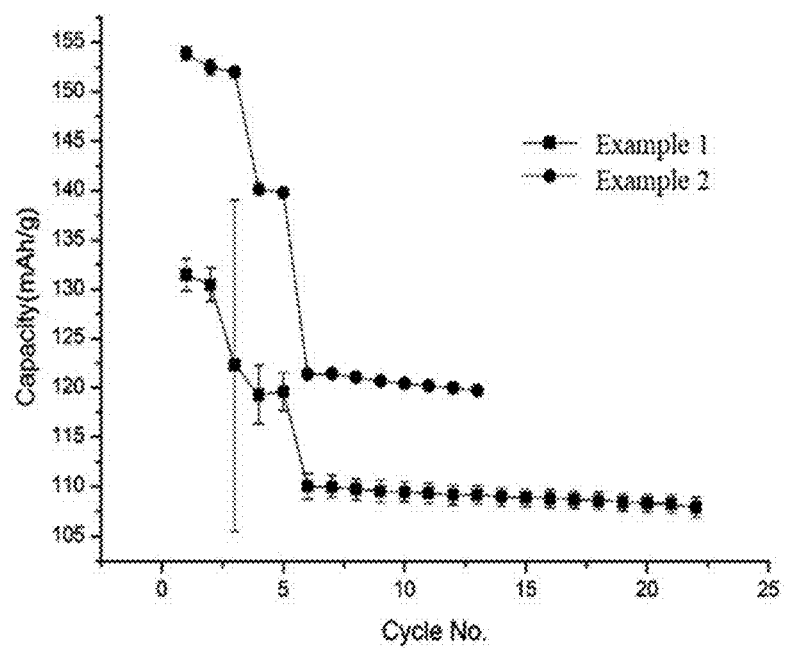
FIG. 10 shows a discharging capacity and cycle performance for coin cells prepared using the particles of Examples 1 and 2.
Figure 11:
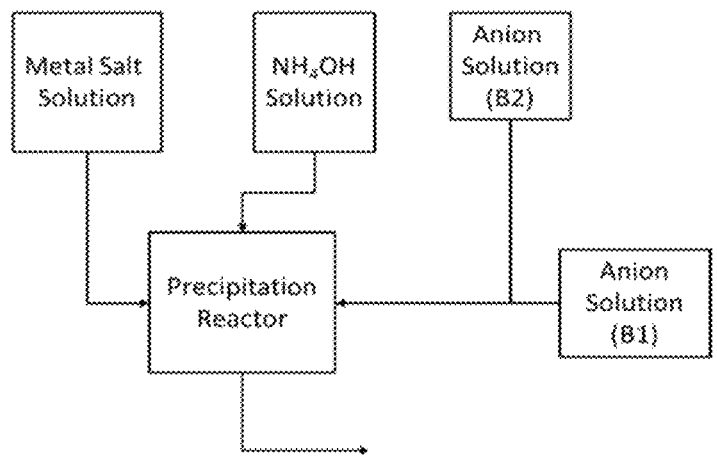
FIGS. 11-15 shows different reaction devices which can be used in the reaction of the present disclosure.
Figure 12:
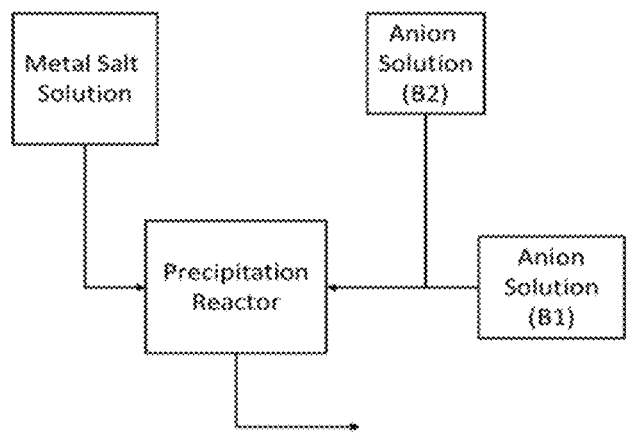
Figure 13:
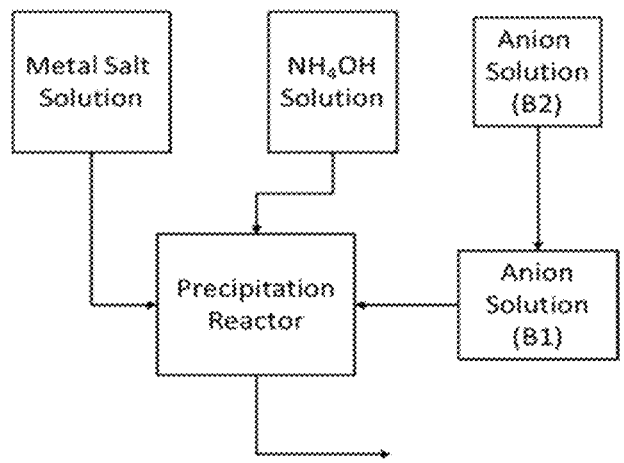
Figure 14:
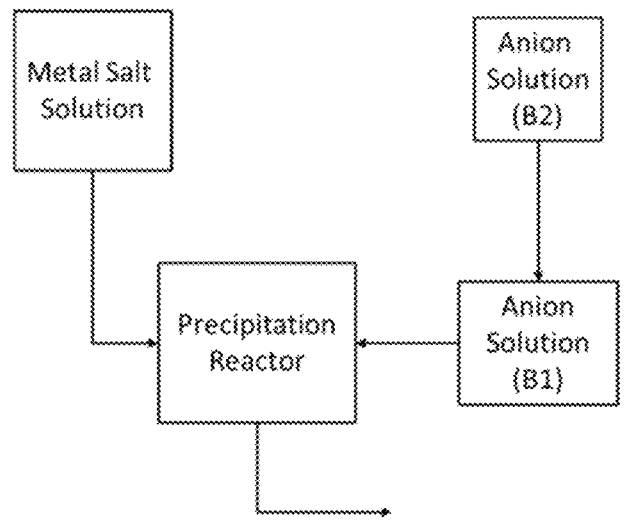
Figure 15:
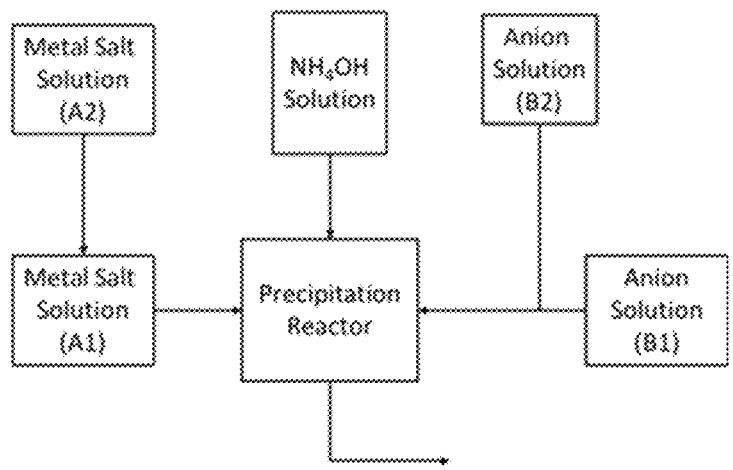

The sealed cells are evaluated on a Neware tester from 2.7-4.4V at 20 mA/g for cycles 1-3, at 66 mA/g for cycles 3-5, and at 200 mA/g for cycles 6 above, except for check cycles done periodically at 20 mAh/g. FIG. 10 shows the discharging capacity and cycle performance of the comparison between the cells prepared with the active particles in Examples 1 and 2. In FIG. 10 the cathode particles of Example 1 and Example 2 are compared for their cycle performance. The comparison shows that example 2 shows a better cycle performance and a better discharging capacity due to the further addition of Al into the solution.

One skilled in the art could understand that the reaction device used in the present disclosure can be various. FIGS. 11-15 shows examples of different reaction devices which could be used in the present disclosure.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

INDUSTRIAL APPLICABILITY

The method of the present disclosure can prepare transitional-metal particle precursor and cathode active particles under co-precipitation reaction. The particle precursor has a core-shell structure, the core and the shell are made of different anions. Such cathode active particle can be used to prepare cathode of lithium-ion battery.

What is claimed is:

1. A method for preparing a particle precursor, comprising the following steps:
   feeding stream (b) into a reactor for providing precipitating anions, feeding stream (a) for providing transitional-metal cations, whereby the precipitating anions and the transitional-metal cations reacting to form a precipitated particle slurry; wherein the stream (b) is fed by the following steps: feeding the stream (b) with only a first anion composition $B_1$; and stopping the first anion composition $B_1$ and feeding the stream (b) with only a second anion composition $B_2$ which is different from the first anion composition $B_1$ at a first switching time between the time when precipitation starts and the time when the reaction ends, wherein the stream (a) comprises at least one cation composition; and
   filtering, and drying the precipitated particle slurry to yield the particle precursor comprising a core-shell structure;
   wherein the first anion composition $B_1$ is in a core layer and the second anion composition $B_2$ is in a shell layer to form the core-shell structure, and the second anion composition $B_2$ in the shell layer initiates a concentration gradient when the first anion composition $B_1$ stops feeding and the second anion composition $B_2$ starts feeding.

2. The method of claim 1, wherein, for indicating whole compositions of the particle precursor, the particle precursor has a formula of $(Ni_xMn_yCo_zMe_{1-x-y-z})(CO_3)_a(OH)_{2-2a}$, where x+y+z≥0.9, z≤0.2, 0≤a≤1, "Me" is at least one additional metal element selected from the group consisting of Mg, Ca, Zr, Ti, V, Cr, Fe, Cu and Al.

3. The method of claim 1, wherein the stream (b) comprises anions whose concentration is 0.001-14 mol anion/L; and/or the stream (a) comprises cations whose concentration is 0.001-6 mol cation/L.

4. The method of claim 1, wherein the stream (b) comprises at least one species selected from the group consisting of NaOH, $Na_2CO_3$, $NaHCO_3$, $Na_2C_2O_4$, LiOH, $Li_2CO_3$, $LiHCO_3$, $Li_2C_2O_4$, KOH, $K_2CO_3$, $KHCO_3$, $K_2C_2O_4$, or combination of the species.

5. The method of claim 1, wherein the first anion composition $B_1$ is hydroxide salts, the second anion composition $B_2$ is at least one selected from the group consisting of carbonate, oxalate, or combination thereof.

6. The method of claim 1, wherein the first switching time when switching the first anion composition $B_1$ to the second anion composition $B_2$ is greater than 50% of the reaction time.

7. The method of claim 1, wherein the stream (a) comprises a first cation composition $A_1$ and a second cation composition $A_2$, the first cation composition $A_1$ is gradually or abruptly switched to the second cation composition $A_2$ at a second switching time between the time the co-precipitation starts and the time the reaction ends.

8. The method of claim 7, wherein the second switching time coincides with the first switching time, or the second switching time is different from the first switching time.

9. The method of claim 7, wherein the first cation composition $A_1$ is the same as the second cation composition $A_2$.

10. The method of claim 7, wherein the first cation composition $A_1$ and the second cation composition $A_2$ has a cation ratio of $Ni_xMn_yCo_zMe_{1-x-y-z}$, where x+y+z≥0.9, z≤0.2, "Me" is at least one additional metal elements selected from the group consisting of Mg, Ca, Zr, Ti, V, Cr, Fe, Cu and Al.

11. The method of claim 10, wherein the first cation composition $A_1$ has a cation ratio of $Ni_xMn_yCo_zMe_{1-x-y-z}$, where x+y+z≥0.9, 0.75≤x≤1; 0≤z≤0.1; the second cation composition $A_2$ has a cation ratio of $Ni_xMn_yCo_zMe_{1-x-y-z}$, where x+y+z≥0.9, 0.3≤x≤0.7; 0.25≤y≤0.5, Me is at least one additional metal elements selected from the group consisting of Mg, Ca, Zr, Ti, V, Cr, Fe, Cu and Al.

12. The method of claim 1, wherein a pH during the reaction is 7-13 and a temperature during the reaction is 30-800° C.

13. The method of claim 1, further comprising a step of feeding stream (c) into the reactor for providing ammonia.

14. A method for preparing cathode active particles, comprising the following steps:
   preparing the particle precursor by the method of claim 1;
   mixing the particle precursor with a lithium source to form a mixture; and
   calcining the mixture to yield the cathode active particles;
   the lithium source is at least one selected from the group consisting of lithium hydroxide, LiOH·$H_2O$, lithium carbonate, $LiNO_3$, lithium acetate, lithium metal and $Li_2O$; and/or a mole ratio between Li from the lithium source and the metal cation from the stream (a) is in a range of 0.5-1.5.

15. The method of claim 14, wherein the calcination is under a temperature of 300-9500° C.; and/or under atmosphere selected from $N_2$, air, dried air, oxygen, or combination thereof.

16. The method of claim 1, wherein the stream (a) provides at least one cation selected from the group consisting of Mg, Ca, Zr, Ti, V, Cr, Mn, Fe, Co, Ni, Cu, Al, or combination thereof, the anion provided by stream (a) is in a form of sulfate, carbonate, chloride, nitrate, fluoride, oxide, hydroxide, oxyhydroxide, oxalate, carboxylate, acetate, phosphate or borate.

* * * * *